United States Patent

Newton

[11] Patent Number: 6,088,934
[45] Date of Patent: Jul. 18, 2000

[54] TWIN FLUID NOZZLE AND METHOD

[75] Inventor: David Newton, Guildford, United Kingdom

[73] Assignee: BP Chemicals Limited, London, United Kingdom

[21] Appl. No.: 08/888,052

[22] Filed: Jul. 3, 1997

Related U.S. Application Data

[63] Continuation of application No. PCT/GB95/03007, Dec. 21, 1995, abandoned.

[30] Foreign Application Priority Data

Jan. 6, 1995 [GB] United Kingdom .................... 9500226

[51] Int. Cl.[7] ...................................................... F26B 17/10
[52] U.S. Cl. ................................. 34/360; 34/367; 34/582; 34/585; 34/224; 110/348; 239/429; 239/434; 239/567
[58] Field of Search .............................. 34/359, 360, 367, 34/576, 582, 585, 218, 224; 239/426, 429, 434, 567; 110/243, 244, 245, 348; 422/139, 140, 143

[56] References Cited

U.S. PATENT DOCUMENTS 4,293,298  10/1981  Bergkvist .................................. 432/58
5,733,510  3/1998  Chinh et al. ............................. 422/143

FOREIGN PATENT DOCUMENTS 2 443 644  7/1980  France .
2 118 454  11/1983  United Kingdom .

OTHER PUBLICATIONS

PCT Application, WO 94/28032, World Intellectual Property Organization, Dec. 1994.
PCT Application, WO 91/12084, World Intellectual Property Organization, Aug. 1991.

*Primary Examiner*—Pamela A. Wilson
*Attorney, Agent, or Firm*—Finnegan, Henderson, Farabow, Garrett & Dunner, L.L.P.

[57] ABSTRACT

A method for injecting a liquid directly into a fluidised bed and a configuration of at least one twin nozzle in which a gas is used to atomise the liquid and each nozzle permits a dispersion of liquid into a vessel containing the fluidised bed.

8 Claims, 1 Drawing Sheet

TWIN FLUID NOZZLE AND METHOD

CROSS-REFERENCES TO RELATED APPLICATIONS

This application is Continuation of International Application PCT/GB95/03007, with an international filing date of Dec. 21, 1995, now abandoned.

BACKGROUND OF THE INVENTION

The present invention relates to a nozzle suitable for use in a method for the injection of liquid directly into a fluidised bed in a continuous process for the gas-phase polymerisation of olefins and in particular to a nozzle which allows for improved control and distribution of liquid into said fluidised bed.

Processes for the homopolymerisation and copolymerisation of olefins in the gas phase are well known in the art. Such processes can be conducted for example by introducing the gaseous monomer into a stirred and/or fluidised bed comprising preformed polyolefin and a catalyst for the polymerisation.

In the fluidised bed polymerisation of olefins, the polymerisation is conducted in a fluidised bed reactor wherein a bed of polymer particles are maintained in a fluidised state by means of an ascending gas stream comprising the gaseous reaction monomer. The start-up of such a polymerisation generally employs a bed of preformed polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed comprises a bed of growing polymer particles, polymer product particles and catalyst particles. This reaction mixture is maintained in a fluidised condition by the continuous upward flow from the base of the reactor of a fluidising gas which comprises recycle gas from the top of the reactor together with make-up feed.

The fluidising gas enters the bottom of the reactor and is passed, preferably through a fluidisation grid, to the fluidised bed.

The polymerisation of olefins is an exothermic reaction and it is therefore necessary to provide means to cool the bed to remove the heat of polymerisation. In the absence of such cooling the bed would increase in temperature until, for example, the catalyst became inactive or the bed commenced to fuse. In the fluidised bed polymerisation of olefins, the preferred method for removing the heat of polymerisation is by supplying to the polymerisation reactor a gas, preferably the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomeric olefin, optionally together with, for example, diluent gas or a gaseous chain transfer agent such as hydrogen. Thus the recycle gas serves to supply the monomer to the bed, to fluidise the bed, and to maintain the bed at the desired temperature. Monomers consumed by the polymerisation reaction are normally replaced by adding make up gas to the recycle gas stream.

It is well known that the production rate (i.e. the space time yield in terms of weight of polymer produced per unit volume of reactor space per unit time) in commercial gas fluidised bed reactors of the afore-mentioned type is restricted by the maximum rate at which heat can be removed from the reactor. The rate of heat removal can be increased for example, by increasing the velocity of the recycle gas and/or reducing the temperature of the recycle gas. However, there is a limit to the velocity of the recycle gas which can be used in commercial practice. Beyond this limit the bed can become unstable or even lift out of the reactor in the gas stream, leading to blockage of the recycle line and damage to the recycle gas compressor or blower. There is also a limit on the extent to which the recycle gas can be cooled in practice. This is primarily determined by economic considerations, and in practise is normally determined by the temperature of the industrial cooling water available on site. Refrigeration can be employed if desired, but this adds to the production costs. Thus, in commercial practice, the use of cooled recycle gas as the sole means of removing the heat of polymerisation from the gas fluidised bed polymerisation of olefins has the disadvantage of limiting the maximum production rates obtainable.

The prior art suggests a number of methods for removing heat from gas fluidised bed polymerisation processes.

GB 1415442 relates to the gas phase polymerisation of vinyl chloride in a stirred or fluidised bed reactor, the polymerisation being carried out in the presence of at least one gaseous diluent having a boiling point below that of vinyl chloride. Example 1 of this reference describes the control of the temperature of polymerisation by the intermittent addition of liquid vinyl chloride to fluidised polyvinyl chloride material. The liquid vinyl chloride evaporated immediately in the bed resulting in the removal of the heat of polymerisation.

U.S. Pat. No. 3,625,932 describes a process for polymerisation of vinyl chloride wherein beds of polyvinyl chloride particles within a multiple stage fluidised bed reactor are kept fluidised by the introduction of gaseous vinyl chloride monomer at the bottom of the reactor. Cooling of each of the beds to remove heat of polymerisation generated therein is provided by spraying liquid vinyl chloride monomer into the ascending gas stream beneath the trays on which the beds are fluidised.

FR 2215802 relates to a spray nozzle of the non-return valve type, suitable for spraying liquids into fluidised beds, for example in the gas fluidised bed polymerisation of ethylenically unsaturated monomers. The liquid, which is used for cooling the bed, can be the monomer to be polymerised, or if ethylene is to be polymerised, it can be a liquid saturated hydrocarbon. The spray nozzle is described by reference to the fluidised bed polymerisation of vinyl chloride.

GB 1398965 discloses the fluidised bed polymerisation of ethylenically unsaturated monomers, especially vinyl chloride, wherein thermal control of the polymerisation is effected by injecting liquid monomer into the bed using one or more spray nozzles situated at a height between 0 and 75% of that of the fluidised material in the reactor.

U.S. Pat. No. 4,390,669 relates to homo- or copolymerisation of olefins by a multi-step gas phase process which can be carried out in stirred bed reactors, fluidised bed reactors, stirred fluidised bed reactors or tubular reactors. In this process polymer obtained from a first polymerisation zone is suspended in an intermediate zone in an easily volatile liquid hydrocarbon, and the suspension so obtained is fed to a second polymerisation zone where the liquid hydrocarbon evaporates. In Examples 1 to 5, gas from the second polymerisation zone is conveyed through a cooler (heat exchanger) wherein some of the liquid hydrocarbon condenses (with comonomer if this is employed). The volatile liquid condensate is partly sent in the liquid state to the polymerisation vessel where it is vaporised for utilisation in removing the heat of polymerisation by its latent heat of evaporation. This reference does not state specifically how the liquid is introduced into the polymerisation.

U.S. Pat. No. 5,317,036 relates to a gas phase polymerisation process which utilises a soluble transition metal catalyst. The soluble catalyst may be introduced into the reactor by use of a spray nozzle which may use an inert gas as an aid to atomisation. No details are disclosed relating to the use of any particular design of nozzle.

EP 89691 relates to a process for increasing the space time yield in continuous gas fluidised bed processes for the polymerisation of fluid monomers, the process comprising cooling part or all of the unreacted fluids to form a two phase mixture of gas and entrained liquid below the dew point and reintroducing said two phase mixture into the reactor. This technique is referred to as operation in the "condensing mode". The specification of EP89691 states that a primary limitation on the extent to which the recycle gas stream can be cooled below the dew point is in the requirement that gas-to-liquid be maintained at a level sufficient to keep the liquid phase of the two phase fluid mixture in an entrained or suspended condition until the liquid is vaporised, and further states that the quantity of liquid in the gas phase should not exceed about 20 weight percent, and preferably should not exceed about 10 weight percent, provided always that the velocity of the two phase recycle stream is high enough to keep the liquid phase in suspension in the gas and to support the fluidised bed within the reactor. EP 89691 further discloses that it is possible to form a two-phase fluid stream within the reactor at the point of injection by separately injecting gas and liquid under conditions which will produce a two phase stream, but that there is little advantage seen in operating in this fashion due to the added and unnecessary burden and cost of separating the gas and liquid phases after cooling.

Published application WO 94/28032, which by reference is incorporated herein, relates to a continuous gas phase fluidised bed process in which the productivity of the process is improved by cooling the recycle gas stream to a temperature sufficient to form a liquid and a gas, separating the liquid from the gas and feeding the separated liquid directly to the fluidised bed. The liquid may be suitably injected into the fluidised bed by means of one or more nozzles arranged therein. It has now been found that by using a particular design of nozzle which uses an atomising gas to assist in the injection of the liquid and which has certain defined parameters, improved distribution and penetration of the liquid into the fluidised bed may be achieved.

SUMMARY OF THE INVENTION

Thus according to the present invention there is provided a method for injecting a liquid directly into a fluidised bed comprising the use of a nozzle or nozzles, each nozzle comprising:

(a) at least one inlet for a pressurised liquid,
(b) at least one inlet for an atomizing gas,
(c) a mixing chamber to mix said liquid and gas, and
(d) at least one outlet through which said gas-liquid mixture is discharged from said mixing chamber directly into the fluidised bed characterised in that
(i) the horizontal penetration of liquid into the fluidised bed at each outlet is in the range 250 to 2500 mm wherein the horizontal penetration is determined from the equation:

$$y = a + bF(X)$$

wherein $y = \dfrac{\text{horizontal penetration (mm)}}{\text{area of outlet (mm}^2)}$ $a$ and $b$ are constants such that $a = 507.469$ and $b = 5400.409$ $$F(X) = \dfrac{1}{[1 + \text{exponential}\,(X - 16.091/3.4698)]} \text{ and}$$

$$X = \dfrac{\text{total liquid flow rate through nozzle (kg/hr)}}{\text{total area of outlets on each nozzle (mm}^2)} \text{ and}$$

(ii) the pressure drop across the mixing chamber is in the range 0.8 to 1.5 bar.

The preferred range for the horizontal penetration of liquid is 350 to 1500 mm.

BRIEF DESCRIPTION OF THE DRAWINGS

The invention will now be described with reference to the drawings, of which.

DETAILED DESCRIPTION OF THE INVENTION

Figure 1:
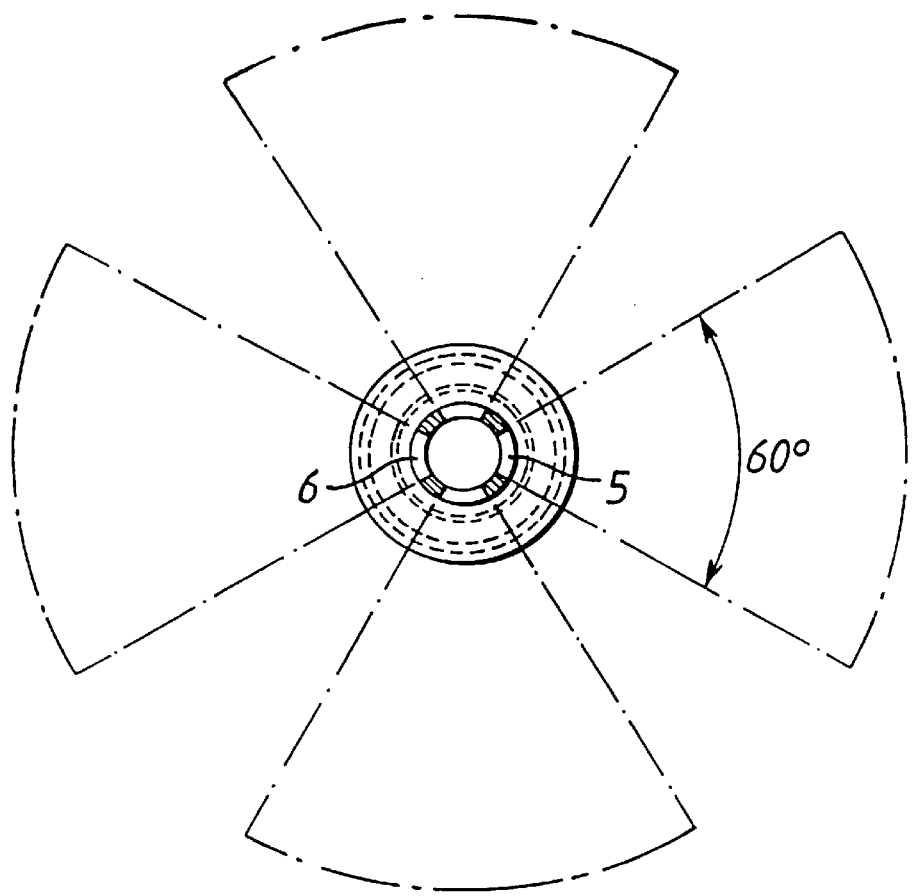
FIG. 1 is a top plan view of a nozzle according to the present invention having four outlets.

The pressure drop across the mixing chamber is defined as the pressure drop between the inlets to the mixing chamber and the outlets of the chamber and may be measured by use of differential pressure transducers suitably located in the nozzle.

The transducers may be used to monitor the pressure fluctuations in the mixing chamber which aids determination of atomising performance during operation.

The preferred pressure drop across the mixing chamber is suitably in the range 1.0–1.25 bar.

The pressure drop across the mixing chamber may be effected by a number of parameters including the size of the mixing chamber, the gas/liquid ratio, the nozzle dimensions etc. By carefully adjusting such parameters the pressure drop may be changed upon scale-up etc to always ensure it is within the required range.

The total liquid flow rate through the nozzle is in the range 500 to 50000 Kg/hr preferably in the range 2000 to 30000 Kg/hr.

The nozzle acccording to the present invention allows for the droplet size of the liquid to be controlled by the atomizing gas as well as providing a good control and narrow distribution of droplet size. The nozzle has the further advantage that should the liquid supply fail the atomizing gas will prevent the ingress of particles from the fluidised bed thus reducing the risk of blockage of the nozzles.

A particular advantage of the nozzle according to the present invention is that during scale up the ratios of both outlet area and flow rate may be suitably adjusted in order to maintain the horizontal penetration within the defined range thereby allowing for optimum performance.

The relationship between the area of the outlets and the flow rate through the nozzle as well as maintaining the required pressure drop is important in achieving the optimum penetration and dispersion of liquid.

The pressure drop in each nozzle measured between the supply of the pressurised liquid or atomising gas and the outlets of the nozzle (i.e., fluidised bed) is typically in the range from 2 to 7 bar preferably 3 to 5 bar.

By use of the nozzles according to the present invention liquid may be introduced into the fluidised bed in the range 0.3 to 4.9 cubic metres of liquid per cubic metre of bed material per hour or even higher.

The liquid injected via the nozzles may suitable be selected from comonomers e.g., butene, hexene, octene e.t.c., or from inert liquids e.g., butane, pentane, hexane e.t.c.

By use of the nozzle according to the present invention the liquid is introduced into the fluidised bed as one or more jets of liquid and gas from one or more outlets. The liquid velocity of the atomised liquid exiting each outlet is typically about 30 m/s. The velocity of the atomising gas is typically in the range of about 2–3 m/s. Each jet of liquid and gas is therefore non-uniform in composition since at the outlets the liquid droplets will be moving at a greater velocity than the atomising gas.

The weight ratio of the atomising gas to the liquid supplied to each nozzle is in the range 5:95 to 25:75.

The atomising gas is suitably make-up ethylene.

Each outlet is preferably arranged around the circumference of the nozzle and produces a jet of liquid and gas. The direction of the liquid/gas jets into the bed is substantially horizontal but may be in a direction other than horizontal at an angle not greater than 45° and preferably not greater than 20°. The preferred angle is 15°.

Each nozzle is suitably equipped with a series of outlets and the number of outlets in each nozzle is in the range 1 to 40 and preferably in the range 3 to 16. The preferred number of outlets is 4.

The outlets on the nozzle are arranged circumferentially and preferably equidistant from one another around the nozzle. In the preferred arrangement of 4 outlets these are arranged such that each outlet provides a gas/liquid spray having an angle in the horizontal plane in the range 20 to 80° but most preferably of 60°.

The outlets are preferably of slot configuration but other configurations may also be used.

The slots may typically have dimensions for example of 10×50 mm or 13×40 mm. The slots typically have an area in the range 300–600 mm².

Figure 2:
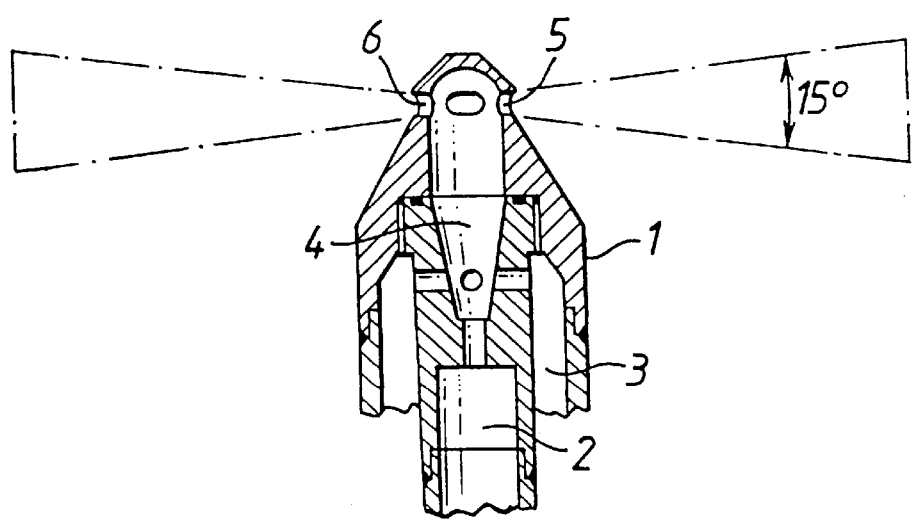
FIG. 2 is a side elevational view in cross-section of the nozzle of FIG. 1.

A preferred nozzle arrangement having 4 outlets is shown in FIGS. 1 and 2 which showvs a nozzle (1) having a supply of atomizing gas from conduit (2), a supply of pressurized liquid from conduit (3) and a mixing chamber (4). Two of the outlets are shown as (5) and (6) in FIG. 2. The liquid and atomising gas enter the chamber (4) through inlets from the separate supply of gas (2) and pressurised liquid (3). These conduits are located one within the other such that the atomising gas passes through the central conduit (2) located within the outer conduit (3) which carries the liquid.

The spray angle of each outlet (5) (6) in the horizontal direction is approximately 60° such that the liquid is dispersed across a substantial cross-section of the bed (approximately 240°/360°). Vertical deflection of the liquid spray is approximately 15° (7.5° in each direction).

The horizontal and vertical spray profiles as shown in FIGS. 1 and 2 result in a conical zone of atomised liquid dispersion into the bed. Such conical spray patterns aid the improved penetration and dispersion of liquid into the bed thereby achieving improved effects of cooling of the bed by the liquid.

Nozzles suitable for use in the present invention may also be defined in terms of the amount of liquid discharged through the outlets arranged therein.

Thus according to another aspect of the present invention there is provided a method for injecting a liquid directly into a fluidised bed comprising the use of a nozzle or nozzles each nozzle comprising:

(a) at least one inlet for a pressurised liquid,
(b) at least one inlet for an atomizing gas,
(c) a mixing chamber to mix said liquid and gas, and
(d) at least one outlet through which said gas-liquid mixture is discharged from said mixing chamber directly into the fluidised bed characterised in that
(i) the rate (R) of liquid discharged from each outlet is in the range 0.009 to 0.130 m³/hr/mm² wherein R is determined from the equation:

$$R = \frac{\text{volume liquid passing through each outlet (m}^3\text{/hr)}}{\text{area of each outlet (mm}^2\text{)}}, \text{ and}$$

(ii) the pressure drop across the mixing chamber is in the range 0.8 to 1.5 bar.

A preferred rate of discharge of liquid is when R is in the range 0.013 to 0.03 m³/hr/mm².

The volume of liquid passing through each outlet is suitably in the range 5.0 to 20 m³/hr, preferably 6.0 to 15 m³/hr.

Nozzles according to the present invention are most suitable for use in a continuous process for the manufacture of polyolefins in the gas phase by the polymerisation of one or more olefins at least one of which is ethylene or propylene. Preferred alpha-olefins for use in the process of the present invention are those having from 3 to 8 carbon atoms. However, small quantities of alpha olefins having more than 8 carbon atoms, for example 9 to 18 carbon atoms, can be employed if desired. Thus it is possible to produce homopolymers of ethylene or propylene or copolymers of ethylene or propylene with one or more $C_3$–$C_8$ alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene or propylene monomer, or as partial replacement for the $C_3$–$C_9$ monomer are dec-1-ene and ethylidene norbornene.

When the process is used for the copolymerisation of ethylene or propylene with alpha-olefins the ethylene or propylene is present as the major component of the copolymer, and preferably is present in an amount at least 70% of the total monomers.

The process may be used to prepare a wide variety of polymer products for example linear low density polyethylene (LLDPE) based on copolymers of ethylene with butene, 4-methylpent-1-ene or hexene and high density polyethylene (HDPE) which can be for example, homopolyethylene or copolymers of ethylene with a small portion of higher alpha olefin, for example, butene, pent-1-ene, hex-1-ene or 4-methylpent-1-ene.

The liquid which is injected via the nozzles is separated from the recycle stream and can be a condensable monomer, e.g. butene, hexene, octene used as a comonomer for the production of LLDPE or may be an inert condensable liquid, e.g. butane, pentane, hexane.

The process is particularly suitable for polymerising olefins at a pressure of between 0.5 and 6 MPa and at a temperature of between 30° C. and 130° C. For example for LLDPE production the temperature is suitably in the range 80°–90° C. and for HDPE the temperature is typically 85–105° C. depending on the activity of the catalyst used.

The polymerisation reaction may be carried out in the presence of a catalyst system of the Ziegler-Natta type, consisting of a solid catalyst essentially comprising a compound of a transition metal and of a cocatalyst comprising an organic compound of a metal (i.e. an organometallic compound, for example an alkylaluminium compound). High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal, of magnesium and of halogen. It is also possible to use a high-activity catalyst consisting essentially of a chromium oxide activated by a heat treatment and associated with a granular support based on a refractory oxide. The process is also particularly suitable for use with metallocene catalysts and Ziegler catalysts supported on silica. Such metallocene catalysts are well known in the literature for examples those disclosed in EP 129368, EP 206794, EP 416815 and EP 420436.

The catalyst may suitably be employed in the form of a prepolymer powder prepared beforehand during a prepolymerization stage with the aid of a catalyst as described above. The prepolymerization may be carried out by any suitable process, for example, polymerisation in a liquid hydrocarbon diluent or in the gas phase using a batch process, a semi-continuous process or a continuous process.

The present invention will now be further illustrated with reference to the accompanying Examples.

EXAMPLES

In view of the large quantities of liquid employed in the nozzle the atomized spray could not be vaporised in a fluid bed of polyethylene.

An experimental rig was therefore used to test the introduction of liquid by use of nozzles according to the present invention. The arrangement of the test rig comprised an aluminium vessel into which a twin fluid nozzle protruded in a downward direction from the top of the vessel (for an example of the nozzle see FIGS. 1 and 2). The nozzle was supplied with an atomising gas and liquid hydrocarbon and the spray pattern and dispersion of the atomised liquid into the vessel was monitored using commercially available X-ray imaging apparatus comprising an X-ray source, an image intensifier and a CCD (charge coupled device) video camera the output of which was continuously recorded on a video tape recorder.

The atomising liquid was sprayed onto the walls of the vessel to coalesce the liquid which drained into a vertical reservoir pot located beneath the nozzle in the bottom of the vessel. The liquid used to test the nozzle parameters was 4-methyl-1-pentene and contained approximately 1–2% by weight of polyethylene fines <355 microns to simulate those present in a recycle liquid stream in order to assess the likelihood of nozzle blockage.

In order that liquid could be continuously fed to the nozzles a closed liquid loop arrangement was maintained, recycling the liquid via a reservoir pot/bypass circuit. The liquid was metered via a calibrated rotameter (S.G. of 0.67, reading 3–36 m$^3$/h liquid) and control valves to the nozzle from the pump bypass circuit. Corrections were made where appropriate for different S.G. fluids. Nitrogen gas was used to atomise the liquid and was metered to the nozzle via calibrated rotameters/orifice plates from cylinder banks located outside the X-ray cell. Typically 50–70 cylinders were connected in series/parallel to obtain sufficient flow of gas to operate the nozzle.

Gas and liquid nozzle inlet pressures upstream of the atomisation chamber were continuously monitored and recorded using Drunk pressure transducers (0–30 barg range, calibrated and accurate to 0.05 bar). The atomisation pressure drop was monitored by a Drunk differential pressure transduced (0–10 barg range, calibrated and accurate to 0.01 bar). All system pressures were recorded by a datalogger during the runs.

The internal flow patterns were recorded directly in video format for subsequent analysis.

Analysis of Example 1 showed that there was a wide oscillation in flow pattern ranging from a slight dribble of liquid to a pattern of irregular flow ie sometimes liquid and sometimes gas. In Example 2 a full spray profile developed indicating the importance of maintaining the required spray profile and pressure drop to ensure the maximum dispersion was obtained.

TABLE

| PARAMETER | EXAMPLE 1 | EXAMPLE 2 |
|---|---|---|
| Nozzle Dimensions | | |
| Number of outlets | 4 | 4 |
| Slot Angle (deg) | 60 | 60 |
| Slot Height (mm) | 10.5 | 10.5 |
| Slot Length (mm) | 45 | 44 |
| Number Liquid Inlets | 8 | 8 |
| Liquid Inlet Diameter (mm) | 8.6 | 7.1 |
| Gas Inlet Diameter (mm) | 9.25 | 11 |
| Mixing Chamber Diameter (mm) | 60 | 50 |
| Nozzle Throughout | | |
| Liquid Rate M$^3$hr | 26.4 | 27 |
| Liquid Mass Rate Kg/hr | 17688 | 18090 |
| Gas/Liquid Ratio % Mass | 4.8 | 7 |
| Nozzle Pressures | | |
| Mixing Chamber ΔP, bar | 0.4–0.92 | 1.15 |
| Liquid ΔP, bar | 1.07 | 4 |
| Gas ΔP, bar | 2.07 | 5 |

What is claimed is:

1. A method for injecting a liquid directly into a fluidised bed comprising injecting the liquid through at least one nozzle comprising:

(a) at least one inlet for a pressurised liquid,
   (b) at least one inlet for an atomizing gas,
   (c) a mixing chamber to mix said liquid and gas, and
   (d) at least one outlet through which a mixture of said liquid and gas is discharged from said mixing chamber directly into the fluidised bed, wherein (i) the rate (R) of liquid discharged from said at least one outlet is in the range 0.009 to 0.130 m³/hr/mm² wherein R is determined from the equation;

$$R = \frac{\text{volume liquid passing through outlet (m}^3/\text{hr)}}{\text{area of outlet (mm}^2)}, \text{ and}$$

(ii) the pressure drop across the mixing chamber is in the range 0.8 to 1.5 bar.

2. The method according to claim 1 wherein the rate of discharge of liquid is in the range 0.013 to 0.03 m³/hr/mm².

3. The method according to claim 1 wherein the volume of liquid passing through said at least one outlet is in the range 5 to 20 m³/hr.

4. The method according to claim 1 wherein the outlet is of a slot configuration.

5. The method according to claim 4 wherein said at least one outlet has an area in the range 300–600 mm².

6. The method according to claim 1, wherein the pressure drop is in the range 1.0 to 1.25 bar.

7. A nozzle for the injection of liquid directly into a fluidised bed comprising:

(a) at least one inlet for a pressurized liquid, (b) at least one inlet for an atomising gas, (c) a mixing chamber to mix said liquid and gas, and (d) at least one outlet, arranged circumferentially around said nozzle, through which a mixture of said liquid and gas is discharged from said mixing chamber directly into the fluidised bed, wherein each outlet is of a slot configuration having an area in the range 300 to 600 mm².

8. The nozzle according to claim 7 wherein the nozzle has 4 outlets.

* * * * *